No. 624,477. Patented May 9, 1899.
L. VON GRAVE.
COUPLING DEVICE FOR FLEXIBLE TUBING.
(Application filed Jan. 11, 1899.)
(No Model.)
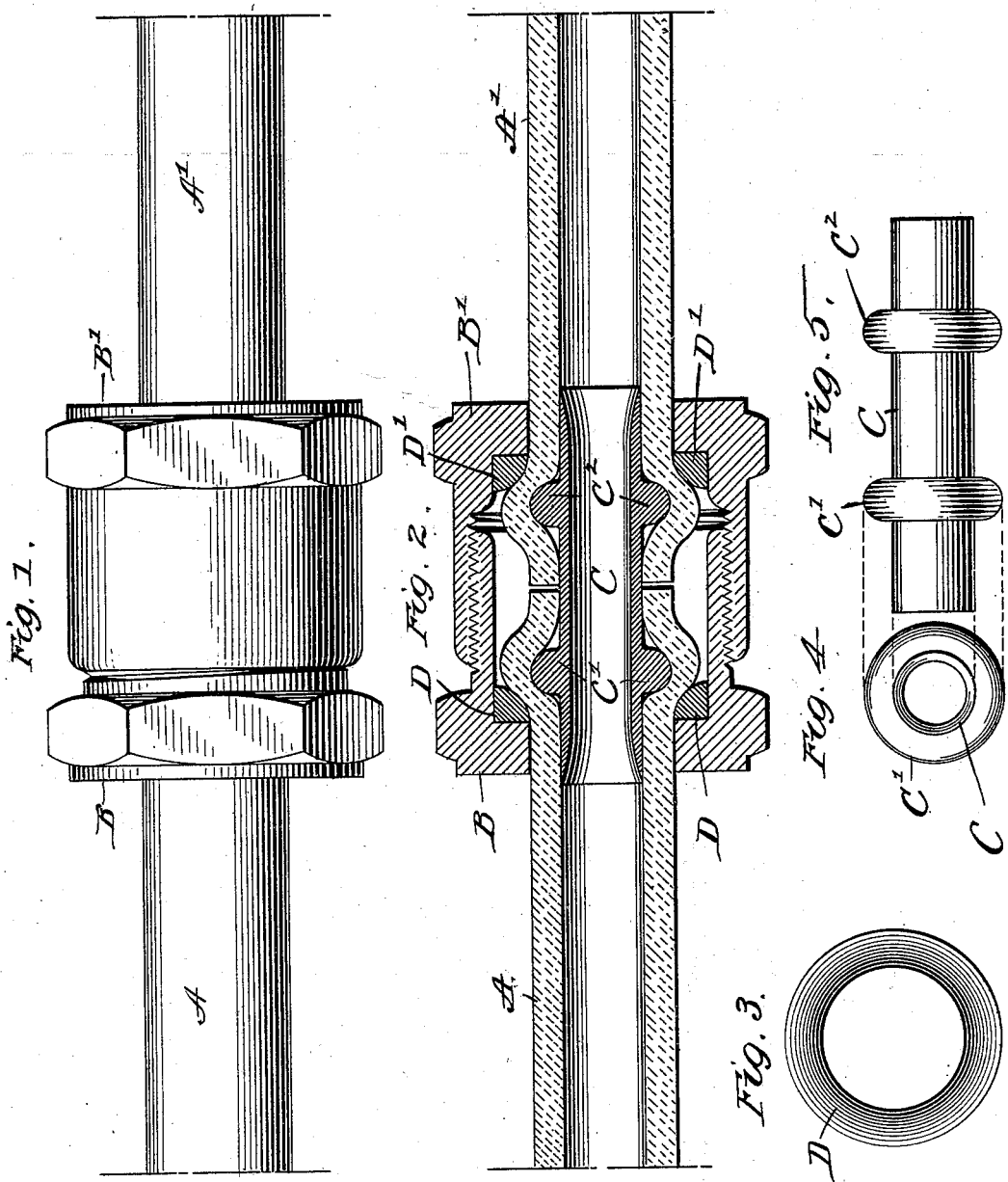
WITNESSES:
INVENTOR:
Lothar von Grave,
BY
ATTORNEY.

UNITED STATES PATENT OFFICE.

LOTHAR VON GRAVE, OF WALLINGFORD, CONNECTICUT, ASSIGNOR OF ONE-THIRD TO GEORGE C. WALDO, OF MOUNT VERNON, NEW YORK.

COUPLING DEVICE FOR FLEXIBLE TUBING.

SPECIFICATION forming part of Letters Patent No. 624,477, dated May 9, 1899.

Application filed January 11, 1899. Serial No. 701,799. (No model.)

*To all whom it may concern:*

Be it known that I, LOTHAR VON GRAVE, a subject of the King of Prussia, Emperor of Germany, residing at Wallingford, New Haven county, Connecticut, have invented certain new and useful Improvements in Coupling Devices for Flexible Tubing, of which the following is a full, clear, and exact description.

My invention relates to an improved coupling for flexible tubing; and among the chief objects are the provision of a simple, inexpensive, and effective means whereby two ends of flexible tubing, such as hose and the like, may be quickly, easily, and effectively connected.

Figure 1 is a side elevation of my invention as it appears in operation. Fig. 2 is a longitudinal section of the parts shown in Fig. 1. Fig. 3 is an end view of the interchangeable independent compression-rings. Fig. 4 is an end view of the internal tubular member. Fig. 5 is a side view of the same.

A A' are ends of flexible tubing, shown as abutting each other or brought into close proximity within a frame-section B B', which, if desirable, may be made in tubular form.

C is an internal rigid tube, which tube is of not substantially greater length than the length of the external frame. On the external surface of the tube C are a plurality of annular rings $C'$ $C^2$.

D D' are independently-movable compression-rings, preferably made interchangeable and held, respectively, within the parts of the frame-sections B B'. The surfaces of these several rings D D', as well as the rings $C'$ $C^2$, may be rounded, so as to present non-cutting bearing-surfaces. One of the sections B B' is preferably arranged with an external screw-thread, while the other part is arranged with an internal screw-thread corresponding therewith to enable the said casing members to be drawn together, or other equivalent means may be provided. The exterior surfaces of the parts B B' may be knurled or otherwise shaped, so as to afford a holding to enable said parts to be grasped and turned or otherwise operated, so as to draw them toward or move them away from each other.

In operation the part B is slipped onto one end A of the hose, while the part B' is slipped onto the other end A'. Each end of the hose A A' is slipped onto the tube C and over the annular projections $C'$ $C^2$ thereon, as shown in Fig. 2. The parts B B' of the external frame are then moved toward each other, and the screw connection or other equivalent means is then brought into play to draw the said parts toward each other. The parts B B' are drawn toward each other until the rings D D' engage the hose or flexible tubing between their bearing-surfaces and the bearing-surfaces of the rings $C'$ $C^2$. By this means an effective union is secured, and thus two bare ends of flexible tubing or hose-pipe may be readily connected or coupled in a quick and effective manner. By this improved construction I am enabled to couple flexible tubing of various size. If, however, the tubing is provided with a reinforce to prevent substantial lateral stretch, such as is frequently provided in fire-hose, the various sizes may be coupled by means of substituting an internal tube C and bearing-rings D D' of an appropriate size.

As shown in the drawings, the opposite ends of the internal tubular reinforce C are tapered or flared outwardly to give less resistance to the flow of the fluid. By this means it will be seen that a very thin tube C may be provided, so that the internal diameter of the tube proper is not materially lessened. The engagement of the hose is effected by the bearing between the annular internal rings D D' $C'$ $C^2$. The latter require no internal reinforce, the same being sufficiently strong of themselves to stand up under the pressure. Thus the tube C simply acts as an alinement-tube and separator for the rings $C'$ $C^2$, and in addition thereto it performs the function of a closure to prevent the escape of fluid.

What I claim is—

A coupling for flexible tubing comprising, a tube, a plurality of rings thereon of greater diameter than said tube, movable rings located outside of said first-named rings and of less internal diameter than the external diameter of said first-named rings, a two-part frame located exteriorly of said tube and carrying said movable rings, and adjusting means as a part of said frame-sections whereby the two members thereof may be adjustably interlocked one with the other.

Signed at Wallingford, Connecticut, this 6th day of January, 1899.

LOTHAR VON GRAVE.

Witnesses:
RUDOLF WAGNER,
WILLIAM F. GEIGER.